United States Patent
Böwing et al.

(10) Patent No.: US 9,464,593 B2
(45) Date of Patent: Oct. 11, 2016

(54) PISTON OF AN INTERNAL COMBUSTION ENGINE

(71) Applicant: Caterpillar Energy Solutions GmbH, Mannheim (DE)

(72) Inventors: Robert Böwing, Innsbruck (AT); Enrico Drehobl, Reilingen (DE); Christian Drexel, Lambsheim (DE); Manfred Rapp, Ubstadt-Weiher (DE)

(73) Assignee: Caterpillar Energy Solutions GmbH, Mannheim (DE)

(*) Notice: Subject to any disclaimer, the term of this patent is extended or adjusted under 35 U.S.C. 154(b) by 72 days.

(21) Appl. No.: 14/391,390

(22) PCT Filed: Apr. 12, 2013

(86) PCT No.: PCT/EP2013/001075
§ 371 (c)(1),
(2) Date: Oct. 8, 2014

(87) PCT Pub. No.: WO2013/152864
PCT Pub. Date: Oct. 17, 2013

(65) Prior Publication Data
US 2015/0101560 A1    Apr. 16, 2015

(30) Foreign Application Priority Data

Apr. 13, 2012  (DE) .................. 10 2012 103 195

(51) Int. Cl.
*F02B 23/06* (2006.01)
*F02F 3/28* (2006.01)

(52) U.S. Cl.
CPC ............. *F02F 3/28* (2013.01); *F02B 23/0639* (2013.01); *Y02T 10/125* (2013.01)

(58) Field of Classification Search
CPC ... F02F 3/28; F02B 23/0639; F02B 23/0621; F02B 23/0624; F02B 23/0627; Y02T 10/125

USPC ............. 123/193.6, 276, 279, 661, 256, 254
See application file for complete search history.

(56) References Cited

U.S. PATENT DOCUMENTS

| 2,172,170 | A | 9/1939 | Megroot |
|---|---|---|---|
| 3,469,564 | A | 9/1969 | Hiereth |

(Continued)

FOREIGN PATENT DOCUMENTS

| CH | 183532 A | 4/1936 |
|---|---|---|
| DE | 2711681 A1 | 5/1978 |

(Continued)

OTHER PUBLICATIONS

U.S. Appl. No. 14/391,330, of Robert Böwing et al. filed Oct. 8, 2014.

(Continued)

*Primary Examiner* — Marguerite McMahon
(74) *Attorney, Agent, or Firm* — Finnegan, Henderson, Farabow, Garrett & Dunner, LLP

(57) ABSTRACT

A piston of an internal combustion engine is disclosed. The piston may have a piston skirt having a central axis. The piston may also have a piston crown delimiting the piston skirt with a diameter D adjacent a top of the piston skirt. The piston crown may have an edge of the piston crown of width b and a piston crown recess of depth t. The piston crown recess may have a piston recess wall with an opening cross section of diameter d. At least one groove with an internal diameter dn may be provided within the edge of the piston crown. The at least one groove may run in a circumferential direction relative to the central axis. The internal diameter dn may be larger than the diameter d.

16 Claims, 1 Drawing Sheet

(56) References Cited

U.S. PATENT DOCUMENTS

| | | | |
|---|---|---|---|
| 3,508,531 A | 4/1970 | Squinto et al. | |
| 4,083,330 A | 4/1978 | Morris | |
| 4,114,518 A | 9/1978 | Glover, Jr. et al. | |
| 4,166,436 A | 9/1979 | Yamakawa | |
| 4,281,629 A | 8/1981 | List | |
| 4,291,655 A | 9/1981 | Yamakawa | |
| 4,440,125 A | 4/1984 | Case | |
| 4,522,172 A | 6/1985 | Oshima et al. | |
| 4,635,597 A | 1/1987 | Ohashi et al. | |
| 4,721,080 A | 1/1988 | Moriyasu et al. | |
| 4,745,891 A | 5/1988 | Cola | |
| 4,771,748 A | 9/1988 | Chmela et al. | |
| 5,065,715 A | 11/1991 | Evans | |
| 5,103,784 A | 4/1992 | Evans | |
| 5,285,755 A | 2/1994 | Regueiro | |
| 5,329,902 A | 7/1994 | Sakamoto et al. | |
| 5,617,823 A * | 4/1997 | Gray et al. | 123/254 |
| 6,213,086 B1 | 4/2001 | Chmela et al. | |
| 6,708,666 B2 * | 3/2004 | Roberts, Jr. | 123/256 |
| 6,745,745 B2 | 6/2004 | Huebler et al. | |
| 6,971,365 B1 | 12/2005 | Najt et al. | |
| 7,055,491 B2 * | 6/2006 | Linderyd et al. | 123/279 |
| 7,185,614 B2 * | 3/2007 | Meffert et al. | 123/41.35 |
| 7,210,448 B2 | 5/2007 | Stanton et al. | |
| 7,472,678 B2 | 1/2009 | Tsujimoto et al. | |
| 8,459,229 B2 | 6/2013 | Rothbauer et al. | |
| 2004/0060537 A1 | 4/2004 | Liu et al. | |
| 2007/0261663 A1 | 11/2007 | Lineton et al. | |
| 2008/0276900 A1 | 11/2008 | Umierski et al. | |
| 2010/0108044 A1 | 5/2010 | Liu | |
| 2011/0253095 A1 | 10/2011 | Rothbauer et al. | |
| 2013/0220266 A1 | 8/2013 | Bandyopadhyay et al. | |

FOREIGN PATENT DOCUMENTS

| | | |
|---|---|---|
| DE | 2945490 A1 | 5/1980 |
| DE | 3590066 C2 | 4/1986 |
| DE | 29515308 U1 | 1/1996 |
| DE | 19927479 A1 | 12/1999 |
| DE | 10261185 A1 | 7/2004 |
| DE | 10 2005 037562 A1 | 5/2006 |
| DE | 10 2009 025063 A1 | 12/2010 |
| DE | 10 2010 027 637 | 1/2012 |
| EP | 0 969 191 A2 | 1/2000 |
| FR | 801 538 A | 8/1936 |
| FR | 2 451 458 A2 | 10/1980 |
| FR | 2 884 284 A1 | 10/2006 |
| FR | 2 927 121 A1 | 8/2009 |
| GB | 522 313 | 6/1940 |
| GB | 2 024 321 A | 1/1980 |
| GB | 2 074 231 A | 10/1981 |
| JP | S52-97009 A | 8/1977 |
| JP | 59-158317 | 9/1984 |
| JP | 62-075019 A | 4/1987 |
| JP | S62-113822 A | 5/1987 |
| JP | S63-001710 A | 1/1988 |
| JP | H07-026959 A | 1/1995 |
| JP | H09-228838 A | 2/1997 |
| JP | H09-096241 A | 4/1997 |
| JP | 11-093779 | 4/1999 |
| JP | 2001-227346 A | 8/2001 |
| JP | 2010-112347 A | 5/2010 |
| JP | 2012-021429 A | 2/2012 |
| WO | WO 85/00198 | 1/1985 |
| WO | WO 02/088528 A1 | 7/2002 |
| WO | WO 2010/142389 | 12/2010 |

OTHER PUBLICATIONS

U.S. Appl. No. 14/391,371, of Robert Böwing et al. filed Oct. 8, 2014.
U.S. Appl. No. 14/391,388, of Robert Böwing et al. filed Oct. 8, 2014.
International Search Report mailed Aug. 14, 2013, in Application No. PCT/EP2013/001076 by European Patent Office (3 pages).
International Search Report mailed Jun. 9, 2013, in Application No. PCT/EP2013/001087 by European Patent Office (3 pages).
International Search Report mailed Sep. 3, 2013, in Application No. PCT/EP2013/001088 by European Patent Office (3 pages).
Office Action issued in Austrian Patent Application No. A 9148/2013, mailed Feb. 17, 2015 (1 page).
Office Action issued in Austrian Patent Application No. A 9146/2013, mailed Apr. 4, 2013 (1 page).
International Search Report mailed Aug. 8, 2013, in Application No. PCT/EP2013/001075 by European Patent Office (2 pages).

* cited by examiner

PISTON OF AN INTERNAL COMBUSTION ENGINE

CLAIM FOR PRIORITY

This application is a U.S. National Phase entry under 35 U.S.C §371 from PCT International Application No. PCT/EP2013/001075, filed Apr. 12, 2013, which claims benefit of priority of German Patent Application No. 10201213195.9, filed Apr. 13, 2012, all of which are incorporated herein by reference.

TECHNICAL FIELD

The present disclosure generally relates to a piston of an internal combustion engine such as an Otto engine having external carburetion. In particular, the present disclosure relates to a piston, which may comprise a piston skirt having a central axis M and a piston crown bounding the piston skirt above with a diameter D. The piston crown may be formed from an edge of the piston crown of width b and a piston crown recess of depth t. Furthermore, he piston crown recess may comprise a piston recess wall with an opening cross section of diameter d.

The present disclosure also generally relates to a diesel engine or

Otto engine or Otto gas engine having a piston guided therein. In particular, the piston guided therein is of the type described herein. The Otto engine or the Otto gas engine can be an engine with external or internal carburetion.

BACKGROUND

A piston for an internal combustion engine is known from DE 10 2010 018 930 A1. This piston comprises four valve pockets within the piston crown, which ensure clearance for the exhaust valves and inlet valves.

With an Otto gas engine, pistons with different piston recess shapes are used. As a rule, a distinction is made between the following common variants:

A) Piston with roof-shaped piston crown. The piston crown is designed for a combustion process with a gas flushed pilot chamber so that the ignition sparks impinge on the combustion chamber walls as late as possible.

B) Piston with trough-shaped piston crown. The piston crown is designed so that a turbulent flow generated on the inlet side is maintained.

C) Piston with omega piston crown recess. The piston crown is designed for optimal direct injection for diesel operation and is also used without changes for gas Otto engines for cost reasons and for the sake of simplicity. However, the latter is despite a possibly poorer combustion process.

D) Piston with pot piston crown recess. The piston crown is designed so that there is a squish flow in the radial direction between the piston edge and the cylinder head. Moreover, the rotational flow in the pot piston crown recess is boosted.

Pistons with pot piston crown recesses are very well suited to engines with rotational inlet channels and chamber plugs. During the compression stroke the mixture is displaced via the edge of the piston crown (squish edge) of the piston into the pot piston crown recess. During the expansion stroke the mixture is sucked back out of the pot piston crown recess. Said process leads to strong squish flows, especially near top dead centre.

In addition to the squish flow, the pot piston crown recess also leads to an acceleration of the rotational flow generated on the inlet side. Because of the conservation of angular momentum, the angular speed of the rotational flow increases if the mixture is displaced inwards into the pot piston crown recess.

The present disclosure is directed, at least in part, to improving or overcoming one or more aspects of prior systems.

SUMMARY OF THE DISCLOSURE

In one aspect of the present disclosure a piston of an internal combustion engine may comprise a piston skirt having a central axis M and a piston crown delimiting the piston skirt above with a diameter D. The piston crown may be formed from an edge of the piston crown of width b and a piston crown recess of depth t. The piston crown recess may comprise a piston recess wall with an opening cross section of diameter d. At least one groove with an internal diameter dn may be provided within the edge of the piston crown and running in the circumferential direction U relative to the central axis M. The internal diameter dn may be larger than the diameter d of the opening cross section of the piston crown recess.

In another aspect of the present disclosure a diesel engine or Otto engine or Otto gas engine may have at least one piston guided therein. The piston may be designed as described above.

BRIEF DESCRIPTION OF THE DRAWINGS

Further advantages and particulars of the present disclosure are explained in the description and are illustrated in the figures. In the figures.

DETAILED DESCRIPTION

Figure 1:
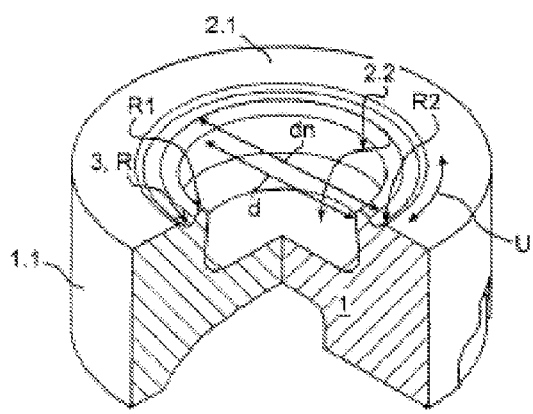
FIG. 1 shows a perspective view of a piston.

A piston 1 illustrated in FIG. 1 is formed from a piston skirt 1.1 with a central axis M and a diameter D and a piston crown 2 bounding the piston skirt 1.1 above with a correspondingly identical diameter D. The piston crown 2 itself is formed from an edge of the piston crown 2.1 of width b and a piston crown recess 2.2 disposed coaxially relative to a central axis M of the piston 1.

The piston crown recess 2.2 has an opening cross section. This corresponds approximately to a maximum internal diameter dn, since the piston crown recess 2.2 is of almost cylindrical form. The piston recess 2.2 has a depth T and is bounded below by a piston recess floor 5 and a piston recess wall 4 joined to the piston recess floor 5.

A circumferential groove 3 with a radius R of approximately 2 mm is provided within the edge of the piston crown 2.1. The groove 3 has an internal diameter dn, which is approximately 15% larger than the diameter d of the opening cross section of the piston recess 2.2. The groove 3 has a radius R1, R2 in the transition region to the edge of the piston crown 2.1, wherein the internal radius R1 is approximately 2.5 mm in size and the external radius R2 is approximately 2 mm in size.

Figure 2A:
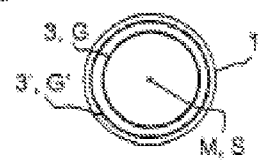
FIGS. 2a-2c show different basic shapes of a groove.

According to FIG. 2a, two grooves 3, 3' are provided. Each groove 3, 3' has a circular basic shape G, G' and is, as illustrated according to FIG. 1, disposed coaxially relative to the central axis M with respect to an axis of symmetry S of the groove 3, 3'.

Figure 2B:
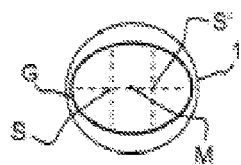
Figure 2C:
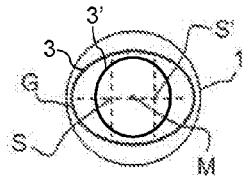

According to the embodiment of FIG. 2b, the groove 3 has an oval basic shape G and is disposed symmetrically relative to the central axis M. The two axes of symmetry S, S' of the groove 3 are thereby disposed eccentrically relative to the central axis M.

Figure 3:
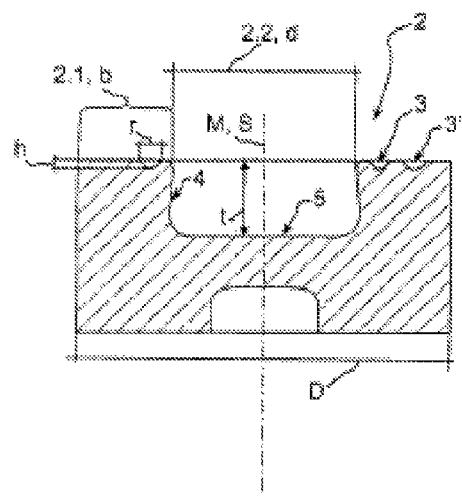
FIG. 3 shows a sectional illustration of the piston with a recess.

According to the embodiment of FIG. 3, left half of the figure, the groove 3 has a height h of approximately 12% of the depth T of the piston recess 2.2. Furthermore, the groove 3 has a radial extent r of approximately 20% of the width b of the edge of the piston crown 2.1.

According to the embodiment of FIG. 3, right half of the figure, two grooves 3, 3' are provided within the edge of the piston crown 2.1. Both grooves are disposed coaxially relative to the central axis M with respect to an axis of symmetry S of the respective groove 3, 3'.

A cooling channel 7 is also provided within the piston 1, which is likewise disposed coaxially relative to the central axis M.

Figure 4:
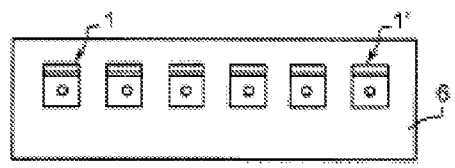
FIG. 4 shows an engine with a plurality of pistons.

According to FIG. 4, an engine 6 comprises six pistons 1, 1' of the type described above.

INDUSTRIAL APPLICABILITY

A piston according to the present disclosure and as described herein may be designed so that improved combustion may be achieved. In particular, the generation of a squish flow and boosting of a rotational flow have a positive effect on the combustion. Due to the disclosed piston it might be possible to convert said directed flows into turbulence in a controlled manner. That may further improve the combustion.

In an exemplary embodiment of the present disclosure the internal diameter may fulfill the following requirement: dn>=1.1 d, that is at least 10% greater than diameter d, i.e. the diameter of the opening cross section. Because of the at least one groove with the internal diameter dn, which can be referred to as a turbulence groove, the squish flow occurring above the edge of the piston crown may be terminated and a turbulent flow component may be established. The combustion is probably optimized by the turbulent flow component. The squish flow may be interrupted by the groove or the grooves on the edge of the piston crown in a direction perpendicular to the squish flow and is converted into turbulence.

In a further exemplary embodiment of the present disclosure said at least one turbulence groove can, for example, be positioned close to the piston crown recess, in the centre of the edge of the piston crown and/or on the outer diameter in the vicinity of the piston skirt or the cylinder wall. The latter also may lead to a reduction of the firing land dead space volume. In this case an external diameter of the groove may correspond to the diameter D of the piston.

In another exemplary embodiment of the present disclosure it would also be possible to displace the groove on the inside of the edge of the piston crown towards the piston recess wall, so that the internal diameter do would be as large as the diameter d of the opening cross section of the piston recess. However, the effect achievable in this way might be the same as with an enlarged piston recess and would perhaps be negligible.

In a further exemplary embodiment of the present disclosure the groove may have a radius R1, R2 in the transition region to the edge of the piston crown, wherein both the inner radius R1 and the outer radius R2 may be between 1 mm and 5 mm, preferably 2 mm to 3 mm in size. The radii may not be too small, so that the edges will not be too hot. The radii may also not be too large, because the discontinuity of the geometry and thus the achievable effect of turbulence are reduced. The measure described above may increase the turbulence in the combustion chamber. The increased turbulence may cause accelerated combustion and more rapid and improved combustion in the cylinder. This could increase the efficiency and the knock margin of the engine. In this exemplary embodiment of the present disclosure the diameter D of the piston crown may correspond to the piston diameter. The diameter d of the opening cross section of the piston crown recess plus twice the width b of the edge of the piston crown may give the piston diameter D. The ratio d/D of the diameter d of the opening cross section or the recess diameter to the diameter D of the piston crown or the piston diameter may be between 0.4 and 0.6. The ratio t/D of the depth t of the piston crown recess to the diameter D of the piston crown or the piston diameter may be between 0.15 and 0.35.

In another exemplary embodiment of the present disclosure it can also be advantageous for this purpose if the groove has a radial extent r in relation to the central axis M and 1 mm<=r<=0.5 b or 2 mm<=r<=0.4 b. The effect of the turbulence may depend on the radial extent r of the groove. For the radial extent r a minimum dimension of approx. 1 mm through 2 mm may be to be assumed, so that the achievable effect of turbulence is effective. The smaller the radial extent r, the more grooves can be provided on the edge of the piston crown.

Moreover, in another exemplary embodiment of the present disclosure, it can be advantageous if the groove has a height h in relation to the axial direction of the central axis M, with 1 mm<=h<=0.2 t or 2 mm<=h<=0.1 t. The same may apply for the height h of the groove. The height h of the groove should not be less than a minimum dimension of approx. 1 mm to 2 mm, so that the achievable effect of turbulence is effective.

In another exemplary embodiment of the present disclosure it can also be advantageous if two, three, four or more grooves are provided distributed across the width b of the edge of the piston crown. With the formation of a plurality of grooves, the effect of turbulence may be boosted. Which combination of the parameters radial extent r, height h and number ensures the greatest effect of turbulence may depend on the respective combustion chamber conditions.

Moreover, in still another exemplary embodiment of the present disclosure, it can be advantageous if the groove extends across the entire circumference U. Symmetrical installation space conditions may be sometimes advantageous, wherein deviations therefrom can also be provided. The extent of the groove in the circumferential direction U can be adapted to the respective flow conditions. The groove can extend across the entire circumference U or can be provided only in the form of partial segments over a part of the circumference U, in the latter case especially in the region of the inlet valves.

Furthermore, in a further exemplary embodiment of the present disclosure, it can be advantageous if the groove has an axis of symmetry S that is disposed coaxially or eccentrically relative to the central axis M. Symmetrical installation space conditions are sometimes advantageous, wherein deviations therefrom can also be provided, as, for example, in the case of an oval piston recess with axes of symmetry S, S' disposed eccentrically relative to the central axis M.

With an eccentric arrangement, different flow conditions may be guaranteed for the regions of the inlet valves and the exhaust valves.

In another exemplary embodiment of the present disclosure it can also be advantageous if the groove has a basic geometry G, wherein the basic geometry G is of circular or oval form. Different flow conditions over the circumference may be ensured with the deviation from the circular form despite the arrangement of the groove symmetrically relative to the central axis M.

In still another exemplary embodiment of the present disclosure it can also be advantageous if at least two grooves are provided, wherein the grooves may have identical or different basic shapes G, G'. A combination of different groove geometries ensures an optimal adaptation to the specified installation space and flow conditions.

The invention claimed is:

1. A piston of an internal combustion engine, comprising:
  a piston skirt having a central axis; and
  a piston crown delimiting the piston skirt with a diameter D adjacent a top of the piston skirt, wherein the piston crown includes:
    an edge of the piston crown of width b;
    piston crown recess of depth t, the piston crown recess comprising a piston recess wall with an opening cross section of diameter d; and
    at least one groove with an internal diameter dn, the groove being provided within the edge of the piston crown and running in a circumferential direction relative to the central axis, wherein the internal diameter dn is larger than the diameter d of the opening cross section of the piston crown recess,
  wherein the groove has an oval shape around the central axis and an axis of symmetry disposed eccentrically relative to the central axis.

2. The piston according to claim 1, wherein the groove has a radial extent r in relation to the central axis and 1 mm$<=$r$<=$0.5 b.

3. The piston according to claim 1, wherein the groove has a height h in relation to the axial direction of the central axis, with 1 mm$<=$h$<=$0.2 t.

4. The piston according to claim 1, wherein the at least one groove is a first groove and the edge of the piston crown includes a plurality of grooves distributed across the width b of the edge of the piston crown.

5. The piston according to claim 1, wherein the groove extends across a circumference of the edge of the piston crown.

6. The piston according to claim 4, wherein a second groove in the plurality of grooves has a circular shape.

7. The piston according to claim 6, wherein the second groove is disposed adjacent the first groove.

8. The piston according to claim 7, wherein the grooves have identical shapes.

9. The piston according to claim 7, wherein the grooves have different shapes.

10. An engine having a piston comprising:
  a piston skirt having a central axis; and
  a piston crown delimiting the piston skirt with a diameter D adjacent a top of the piston skirt, wherein the piston crown includes:
    an edge of the piston crown of width b;
    a piston crown recess of depth t, the piston crown recess comprising a piston recess wall with an opening cross section of diameter d; and
    at least one groove with an internal diameter dn, the groove being provided within the edge of the piston crown and running in a circumferential direction relative to the central axis, wherein the internal diameter dn is larger than the diameter d of the opening cross section of the piston crown recess,
  wherein the groove has an oval shape around the central axis and an axis of symmetry disposed eccentrically relative to the central axis.

11. The engine according to claim 10, wherein the groove has a radial extent r in relation to the central axis and 1 mm$<=$r$<=$0.5 b.

12. The engine according to claim 10, wherein the groove has a height h in relation to the axial direction of the central axis, with 1 mm$<=$h$<=$0.2 t.

13. The engine according to claim 10, wherein the at least one groove is a first groove and the edge of the piston crown includes a plurality of grooves distributed across the width b of the edge of the piston crown.

14. The engine according to claim 10, wherein the groove is disposed around a circumference of the edge of the piston crown.

15. The engine according to claim 13, wherein a second groove in the plurality of grooves has a circular shape.

16. The engine according to claim 13, wherein the grooves have different shapes.

* * * * *

UNITED STATES PATENT AND TRADEMARK OFFICE
CERTIFICATE OF CORRECTION

PATENT NO. : 9,464,593 B2
APPLICATION NO. : 14/391390
DATED : October 11, 2016
INVENTOR(S) : Böwing et al.

Page 1 of 1

It is certified that error appears in the above-identified patent and that said Letters Patent is hereby corrected as shown below:

In the Specification

Column 1, Line 9, delete "Application No. 10201213195.9," and insert -- Application No. 102012103195.9, --.

Signed and Sealed this
Third Day of January, 2017

Michelle K. Lee
*Director of the United States Patent and Trademark Office*